United States Patent
Flynt et al.

(10) Patent No.: US 7,561,677 B2
(45) Date of Patent: Jul. 14, 2009

(54) COMMUNICATION CONVERSION BETWEEN TEXT AND AUDIO

(75) Inventors: David W. Flynt, Lake Forest Park, WA (US); Autumn L. Stroupe, North Bend, WA (US); Marc W. Todd, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 11/066,743

(22) Filed: Feb. 25, 2005

(65) Prior Publication Data
US 2006/0193450 A1 Aug. 31, 2006

(51) Int. Cl.
*H04M 11/00* (2006.01)
(52) U.S. Cl. .............. 379/88.14; 379/88.01; 379/88.12; 379/88.23; 704/246
(58) Field of Classification Search .............. 379/88.13, 379/88.14

See application file for complete search history.

(56) References Cited

U.S. PATENT DOCUMENTS

| | | | |
|---|---|---|---|
| 6,072,862 A * | 6/2000 | Srinivasan | 379/100.08 |
| 6,173,250 B1 * | 1/2001 | Jong | 704/3 |
| 6,668,043 B2 * | 12/2003 | Hyziak et al. | 379/52 |
| 7,065,185 B1 * | 6/2006 | Koch | 379/88.14 |
| 2003/0216913 A1 | 11/2003 | Keely et al. | |
| 2003/0225797 A1 | 12/2003 | Shields et al. | |
| 2004/0075687 A1 | 4/2004 | Oshiro et al. | |
| 2004/0210851 A1 | 10/2004 | Premchandran et al. | |
| 2005/0048992 A1 * | 3/2005 | Wu et al. | 455/466 |

* cited by examiner

*Primary Examiner*—Simon Sing
(74) *Attorney, Agent, or Firm*—Klarquist Sparkman, LLP

(57) ABSTRACT

Techniques and tools are described for converting incoming and/or outgoing communications to usable and convenient formats. For example, a user selects a desired profile from a group of available profiles, and the selected profile is activated. If a first profile is selected and an incoming communication having a textual component is received while the first profile is active, then the textual component is converting to an audio format and recited. If a second profile is selected and an incoming communication having an audio component is received while the second profile is active, then the audio component is converted to a textual format and displayed.

17 Claims, 9 Drawing Sheets

Software 180 Implementing Communication Conversion Between Audio and Text

COMMUNICATION CONVERSION BETWEEN TEXT AND AUDIO

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Described tools and techniques relate to communications, and specifically to conversion of communication items between audio and text.

BACKGROUND

Mobile communication devices, such as personal desktop assistants, contemporary mobile telephones, hand-held computers, tablet personal computers, laptop personal computers, wearable computers and the like are becoming popular user tools. In general they have become small enough to be extremely convenient, while consuming less battery power, and at the same time have become capable of running more powerful applications. Such communication devices are often used to keep a user updated with current information by notifying the user of incoming messages. Such messages include audio speech messages such as telephone calls or voicemail, and textual messages such as e-mail, SMS (short message service) messages, and instant messages.

Mobile device users often multi-task by monitoring incoming communication on a mobile device while participating in some other activity, such as a meeting. Currently, they can attempt to do so discreetly by setting the device volume to vibrate or silent and relying on data shown in a preview format such as caller ID or the subject of a message to help them decide if they need to respond soon or if the request can wait. Depending on the nature of multi-tasking (in a one-to-one meeting, at a conference, driving, etc.) and the environment (noisy, dark, quiet, etc.), the device user may or may not be able to easily monitor incoming communication. For example, in a meeting a device user may not be able to discreetly participate in the meeting and listen to incoming audio voice messages. As another example, a device user driving a car may not be able to easily and safely drive the car and view incoming textual messages.

SUMMARY

In summary, the detailed description is directed to various techniques and tools for incoming and/or outgoing communications, and specifically to tools and techniques related to converting incoming and/or outgoing communications to usable and convenient formats. Described embodiments implement one or more of the described techniques and tools including, but not limited to, the following:

In one aspect, a method includes accepting a user command to select a desired profile from a group of available profiles, and activating the desired profile. If the desired profile is a first profile, and an incoming communication having a textual component is received while the first profile is active, then the textual component is converted to an audio format and recited. If the desired profile is a second profile, and an incoming communication having an audio component is received while the second profile is active, then the audio component is converted to a textual format and displayed.

In another aspect, a communication device includes a memory storing computer software and a processor programmed to execute the software. The software can be executed to accept set-up user input related to conversion of messages between audio and text and to receive an incoming communication. If the incoming communication has a textual component and the set-up user input dictates conversion of the textual component to audio, then the textual component is converted to audio. If the incoming communication has an audio component and the set-up user input dictates conversion of the audio component to text, then the audio component is converted to text. The software can also be executed to accept a user command to create an outgoing message in an outgoing message format. If the outgoing message format is textual and the set-up user input dictates that the outgoing message be entered as audio, then audio user input is accepted and converted into a textual message. If the outgoing message format is audio and the set-up user input dictates that the outgoing message be entered as text, then textual user input is accepted and converted into an audio message.

In another aspect, a computer-readable medium stores computer-executable instructions for causing a computer system to perform a method. The method includes accepting a user command to select a desired profile from a group of available profiles and activating the desired profile. If the desired profile is an audio profile, then an incoming textual message is received while the audio profile is active, converted to an audio format, and recited. If the desired profile is a textual profile, then an incoming audio message is received while the textual profile is active, converted to a textual format, and displayed.

The various techniques and tools can be used in combination or independently.

Additional features and advantages will be made apparent from the following detailed description of different embodiments that proceeds with reference to the accompanying drawings.

DETAILED DESCRIPTION

The present application relates to techniques and tools for sending, receiving and processing communications, and specifically to processing communications so that they can be received and/or sent in a desired format. Described embodiments implement one or more of the described techniques and tools.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific user interfaces, other user interfaces also can be used.

The various techniques and tools can be used in combination or independently. Different embodiments implement one or more of the described techniques and tools. Some techniques and tools described herein can be used in a mobile computing device, such as a mobile telephone or handheld computer, or in some other computing device, for example a desktop computer.

I. Computing Environment

Figure 1:
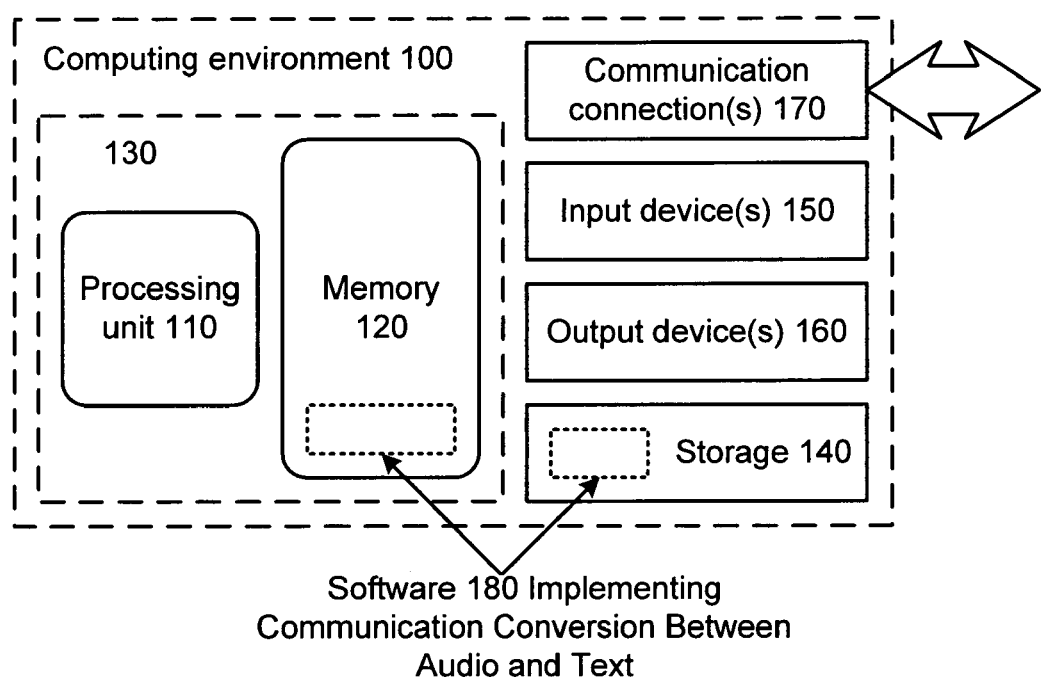
FIG. 1 is a block diagram of a suitable computing environment in conjunction with which described embodiments may be implemented.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and a memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing audio and/or text conversion with one or more of the described techniques and tools.

A computing environment may have additional features. For example, the computing environment (100) includes a storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing audio and/or text conversion.

The input device(s) (150) may be a touch input device such as a keyboard, mouse, pen, or trackball, a touch screen, a voice input device, a scanning device, or another device that provides input to the computing environment (100). The input device(s) (150) may also be a sound card, video card, TV tuner card, or similar device that accepts audio or video input in analog or digital form, or a CD-ROM or CD-RW that reads information into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include the memory (120), the storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "predict," "compensate," and "apply" to describe computer operations in a computing environment. These terms are high-level abstractions for operations performed by a computer, and should not be confused with acts performed by a human being. The actual computer operations corresponding to these terms vary depending on implementation.

II. Communication Device

Figure 2:
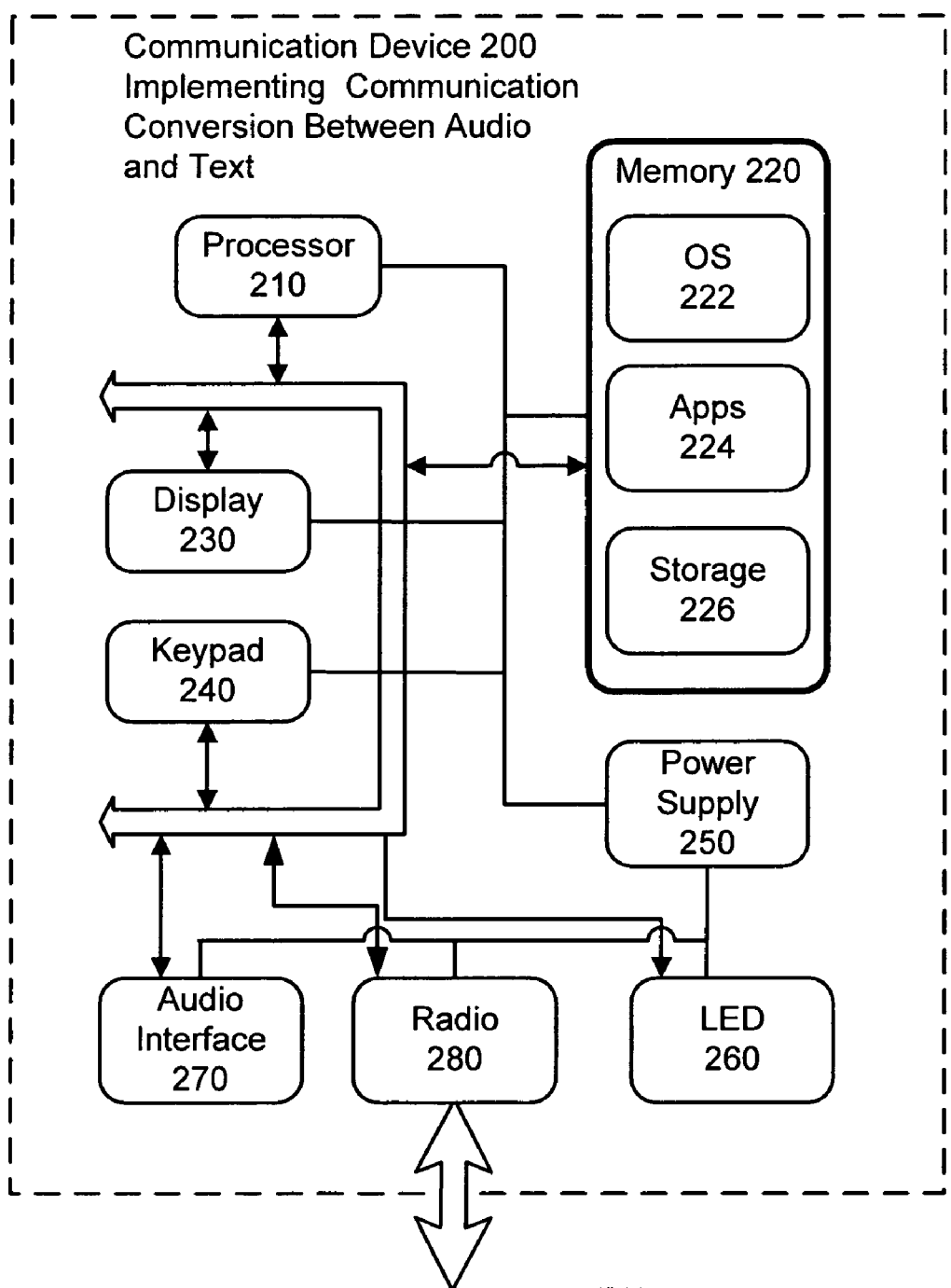
FIG. 2 is a block diagram of a suitable communication device in conjunction with which described embodiments may be implemented.

The computing environment may be in the form of a communication device, such as the communication device (200) illustrated as a functional block diagram in FIG. 2. The communication device (200) is capable of implementing one or more of the tools and techniques related to text and audio conversion described below. The communication device (200) may be implemented as one or more desktop personal computers, multiprocessor systems, microprocessor-based or programmable consumer electronics, network PCs, and the like. In one implementation, the communication device (200) is a mobile communication device.

The communication device (200) may include many more components than those shown in FIG. 2. The components shown, however, are sufficient to disclose an illustrative embodiment for implementing the disclosed tools and techniques.

As shown in FIG. 2, the communication device (200) includes a processor (210), a memory (220), a display (230), and a keypad (240). The memory (220) generally includes both volatile memory (e.g., RAM) and non-volatile memory (e.g., ROM, Flash Memory, or the like). The communication device (200) includes an operating system (222), such as Windows Mobile or Windows CE operating systems available from Microsoft Corporation or other such operating system, which is resident in the memory (220) and executes on the processor (210). The keypad (240) may be a push button numeric dialing pad (such as on a typical telephone) or a multi-key keyboard (such as a conventional keyboard). The display (230) may be a liquid crystal display, or any other type of display commonly used in mobile computing devices. For example, the display (230) may be touch-sensitive, and would then also act as an input device.

One or more application programs (224) are loaded into the memory (220) and run on the operating system (222). Instructions for implementing audio and/or text conversion may be included in one or more application programs (224) and/or in the operating system (222). Examples of application programs include telephone dialer programs, a switch manager, e-mail programs, calendar programs, word processing programs, spreadsheet programs, and so forth. The communication device (200) also includes non-volatile storage (226) within the memory (220). Non-volatile storage (226) may be used to store persistent information which should not be lost if the communication device (200) is powered down. The application programs (224) may use and store information in storage (226), such as e-mail, SMS, MMS, or other messages used by an e-mail application, appointment information used by a calendar program, documents used by a word processing application, and the like. A synchronization application may also reside on the communication device (200) and is programmed to interact with a corresponding synchronization application resident on a host computer to keep the information stored in storage (226) synchronized with corresponding information stored at the host computer.

The communication device (200) also includes a power supply (250), which may be implemented as one or more batteries. The power supply (250) might further include an external power source, such as an AC adapter or a powered docking cradle that supplements or recharges the batteries.

The communication device (200) is also shown with two types of external notification mechanisms: an LED (260) and an audio interface (270). Other components, such as the display (230) may also operate as notification mechanisms. These devices may be directly coupled to the power supply (250) so that when activated, they remain on for a duration dictated by the notification mechanism even though the processor (210) and other components might shut down to conserve battery power. The LED (260) may be programmed to remain on indefinitely until the user takes action to indicate the powered-on status of the device. The audio interface (270) is used to provide audible signals to and receive audible signals from the user. For example, the audio interface (270) may be coupled to a speaker for providing audible output and to a microphone for receiving audible input, such as to facilitate a telephone conversation.

The communication device (200) also includes a radio (280) that performs the function of transmitting and receiving radio frequency communication. The radio (280) facilitates wireless connectivity between the communication device (200) and the outside world, for example via a communication carrier or service provider. Transmissions to and from the radio (280) are conducted under control of the operating system (222). In other words, communications received by the radio (280) may be disseminated to the application programs (224) via the operating system (222), and vice versa.

The radio (280) allows the communication device (200) to communicate with other computing devices, such as over a network. The radio (280) is an example of communication media discussed above.

III. Display Layout Implementation

Figure 3:
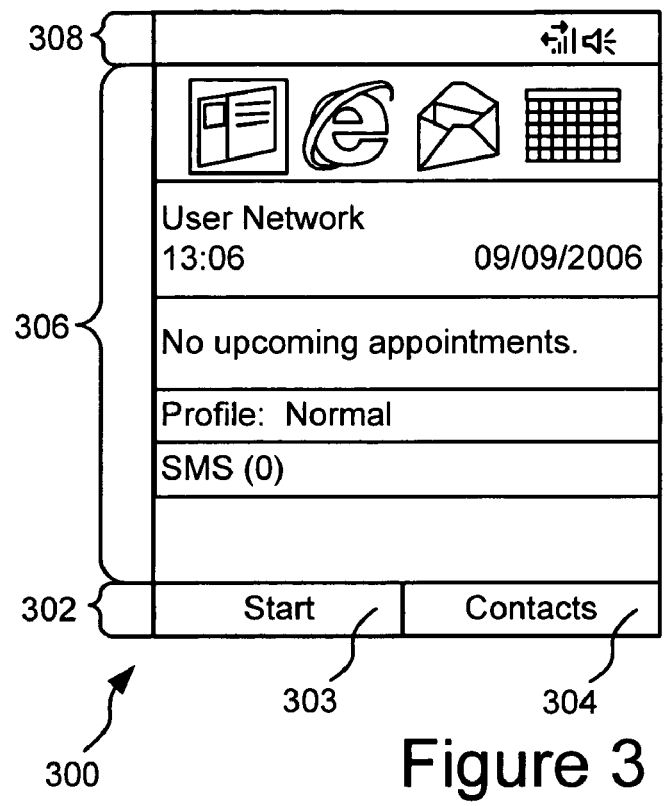
FIG. 3 is a diagram of a general display layout in conjunction with which described embodiments may be implemented.

FIG. 3 is a diagram illustrating the layout of an exemplary display screen (300) of a computing device such as the communication device (200) described above. The display screen (300) is a home screen that generally acts as an entry point to other screens and features. However, similar display features are present on lower level screens that are accessed from the home screen, as will become apparent from the description of other screens below. Generally, the implementation of the display screen (300) illustrated in FIG. 3 includes a soft key bar (302) along the bottom of the display. The soft key bar (302) includes a left soft key (303) and a right soft key (304). Each soft key (303, 304) displays a particular action, menu, screen, or other feature that is accessed by actuating a corresponding button on the communication device (referred to herein as actuating the soft key). The soft keys may be specific to the context of the application or feature that is currently being accessed. In some implementations, the right soft key (304) is used by applications to display context-specific menus, and the left soft key is used by applications to display context specific actions. In the particular home display screen (300) illustrated in FIG. 3, the left soft key (303) can be actuated to display a start screen that lists applications and features available on the communication device, such as calendar, e-mail, voicemail, call history, contacts, settings, and the like. The right soft key (304) can be actuated to display the contacts screen that lists information for available contacts.

Above the soft key bar (302) is a main screen area (306) that displays various information depending on the context. In the home screen, the main screen area (306) can include icons to directly access particular features or applications, as well as status information. Above the main screen area (306) is a title bar (308), which can display application and status information, such as the title of the current application, the date, bars indicating radio signal strength, and the like.

The particular display screens described and illustrated herein are described as particular screens that can implement the described tools and techniques. However, various other types of display screen layouts or other types of user interfaces, such as audio interfaces, could be used.

IV. Communication Conversion Between Text and Audio

Mobile device users often multi-task by monitoring incoming communication on a mobile device while participating in some other activity, such as a meeting. Currently, they can attempt to do so discreetly by setting the device volume to vibrate or silent and relying on data shown in a preview format such as caller ID or the subject of a message to help them decide if they need to respond soon or if the request can wait. Depending on the nature of multi-tasking (in a one-to-one meeting, at a conference, driving, etc.) and the environment (noisy, dark, quiet, etc.), the device user may or may not be able to easily monitor incoming communication.

For example, a device user may not be able to discreetly participate in a meeting and listen to incoming audio voice messages. Accordingly, such a user can choose a text format profile. All incoming messages can be converted to a desired textual format for viewing. Thus, if a caller leaves a voicemail, the content of the message is converted to text and presented on the device display. The user can reply to the converted message by typing a message that is sent to the caller in a textual format such as e-mail, or by typing a message that is converted to an audio voice message and sent to the caller. In this way, the user can interact with a caller without listening to the device or speaking into the device.

As another example, a device user driving a car may not be able to easily and safely drive the car and view incoming textual messages. However, the user can choose an audio format profile. When a new e-mail is received, the device audibly recites the sender's name and the subject of the message. If the user chooses, the device recites the message. Similarly, when a telephone call comes in, the device can tell the user who is calling and allow the user to accept or decline the telephone call. Accordingly, the user can review textual messages such as e-mail and can screen incoming calls while keeping her eyes on the road. She can also keep here hands on the steering wheel if the device is setup for hands-free use.

A. Communication Manager User Interface Example

Figure 4:
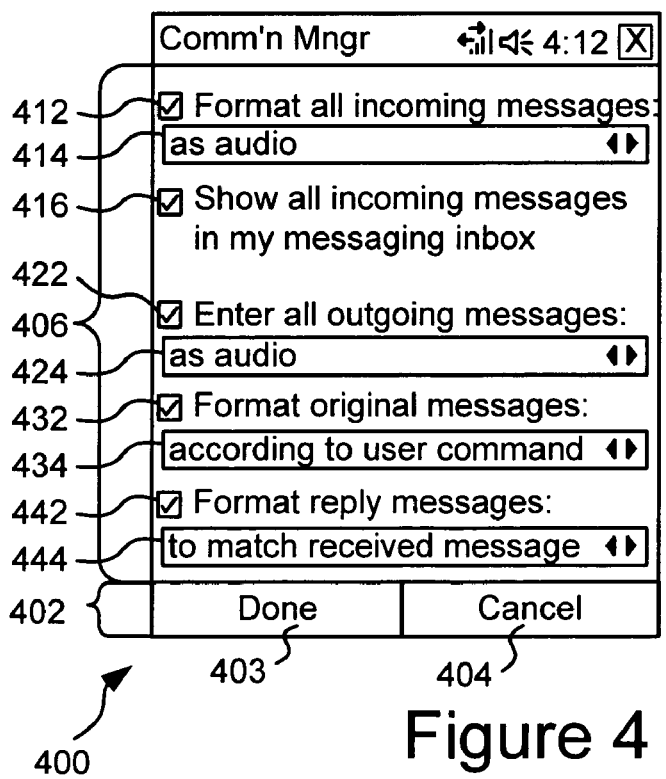
FIG. 4 is a diagram illustrating an exemplary display screen for setting up one or more message format profiles.

FIG. 4 illustrates an exemplary message format for a communication manager display screen (400) for setting up one or more message format profiles. The communication manager display screen (400) includes a soft key bar (402). The soft key bar (402) includes a left soft key (403) that can be actuated to indicate that the user is done changing communication management settings, and to save the settings currently displayed. A right soft key (404) can be actuated to cancel any changes to the communication management settings.

A main screen area (406) displays current communication management settings. Specifically, the main screen (406) includes an incoming message formatting checkbox (412) that can be actuated to activate or deactivate incoming message conversion profiles. If the checkbox (412) is not checked, then incoming messages are not reformatted according to the profile (although it is possible they may be reformatted for some other purpose). If the checkbox (412) is checked, then incoming messages are converted to the format shown in an incoming format selection box (414). The selection box (414), as well as similar selection boxes discussed below, can be scrolled through various choices, such as by actuating left and right arrow keys on a communication device. If messages are to be converted to a particular format, then other similar information can also be reformatted. For example, if all incoming messages are converted to audio, then reminders could also be converted to audio and read to the user by the device. Similarly, caller ID information could be read to the user by the device, rather than being displayed as text.

A messaging inbox checkbox (416) can be checked to show all incoming messages in the messaging inbox. If the checkbox (416) is not checked, then incoming messages are shown in the inbox corresponding to the format of the message (e-mail, voicemail, etc.).

An outgoing message entry checkbox (422) can be checked to enter all outgoing messages in a format indicated by an outgoing message entry selection box (424). For example, all outgoing messages can be entered as audio (such as by talking) or as text (by depressing keys, using a touch-sensitive screen, etc.). If the checkbox (422) is not checked, then all outgoing messages are entered in their native format. For example, if the checkbox (422) is not checked, then e-mails are entered as text and audio voice messages are entered as audio.

An outgoing original message format checkbox (432) can be checked to indicate that original outgoing messages (those that are not replies to an incoming message) are sent in a format indicated in the format original message selection box (434). For example, all original outgoing messages can be formatted as audio whether they are entered as audio or text. Alternatively, the messages can be formatted according to instructions provided by a user command, which could itself be in various formats, such as a text command or an audio command.

An outgoing reply message format checkbox (442) can be checked to indicate that all reply messages are sent in a particular format entered in the outgoing reply message format selection box (444). Alternatively, they can be formatted to match the format of the received message to which the outgoing message is replying (shown), or they could be formatted according to a user's specific command.

The communication manager could include other settings to be entered by a user. For example, the communication manager could include a setting requiring an auto-reply message to be sent when a message was received that was not in a desired format. The auto-reply message could state the user's desired format for incoming messages so that contacts sending messages to the user could use the desired format. As another example, the user could specify that a broadcast message be sent to all contacts or a subset of all contacts, specifying a desired format. As yet another example, the user could specify that the desired format be included with electronic contact information that the user provides to others, such as an electronic business card.

The settings illustrated in FIG. 4, as well as other related settings can be communicated to a server so that a server can perform desired actions. For example, a voicemail may be converted to text at a server, and the text could then be forwarded to a client (such as a mobile communication device), rather than the client converting the voicemail.

B. User Interface Example (Incoming Voicemail Formatted as Text)

Figure 5:
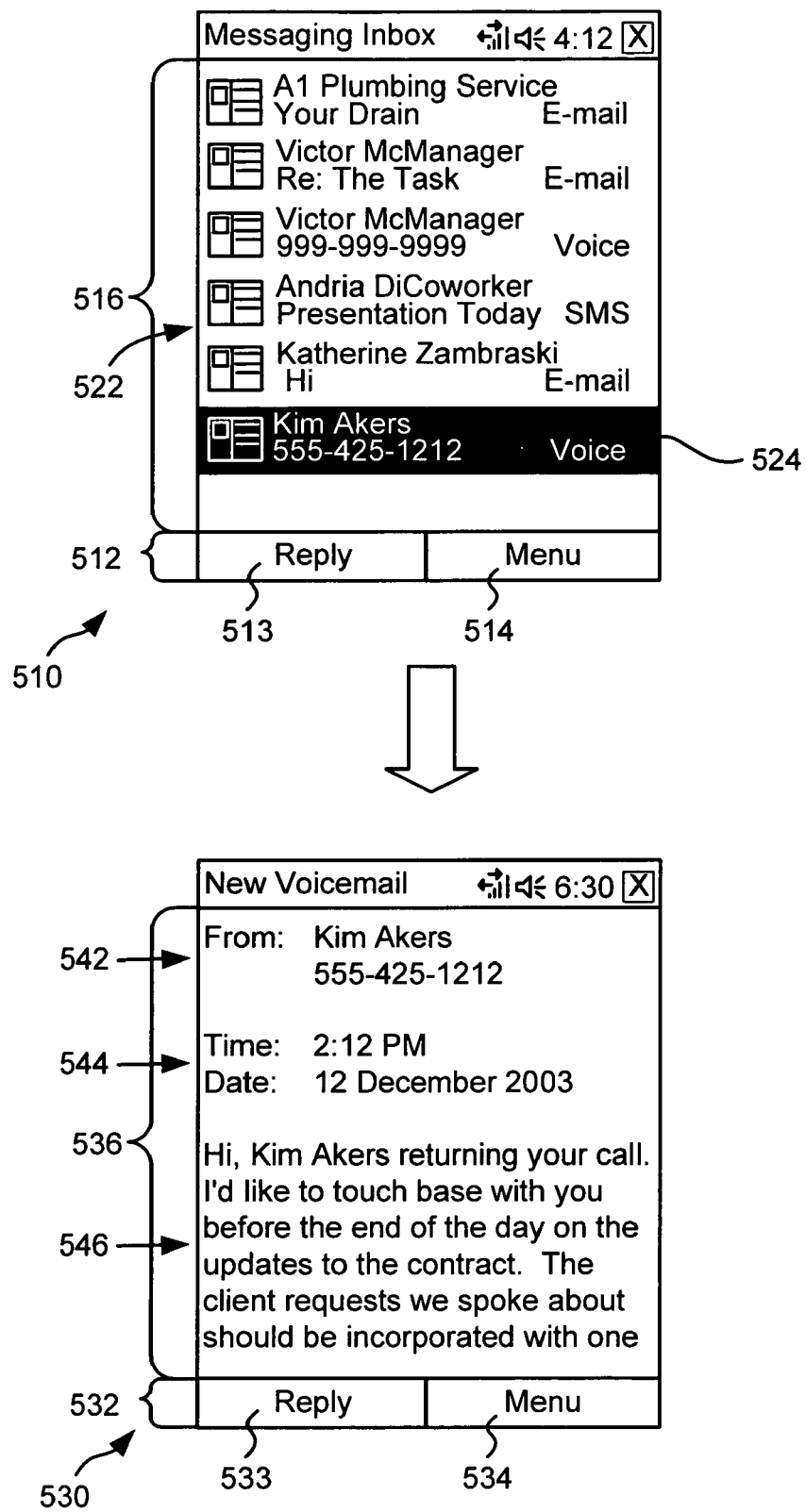
FIG. 5 is a diagram illustrating an exemplary flow of display screens for receiving a voicemail while a text message format profile is active.

FIG. 5 illustrates a flow of display screens for receiving a voicemail converted to text. Incoming messages can be displayed on a display screen, such as the exemplary messaging inbox display screen (510). The display screen (510) includes a soft key bar (512). The soft key bar (512) includes a left soft key (513) that can be actuated to reply to a highlighted incoming message. A right soft key (514) can be actuated to access menu items that can be actuated in turn to perform pertinent commands, such as forwarding a message, deleting a message, and accessing pertinent settings. A main screen area (516) includes a message list (522) that lists identifying information for all incoming messages, even if the messages have different formats. For example, the message list (522) can list e-mails, voicemails, SMS messages, and the like. The messaging inbox display screen (510) could also list other information, such as information regarding missed calls.

If the information (524) identifying a voicemail from Kim Akers is highlighted and selected, then a new voicemail display screen (530) is displayed. A soft key bar (532) on the display screen (530) includes a left soft key (533) and a right soft key (534) that can perform the same functions as the respective left soft key (513) and right soft key (514) of the messaging inbox display screen (510) discussed above. A main screen area (536) includes sender identifying information (542), such as the name and telephone number of the caller who left the voicemail, if available. The main screen area (536) also includes date and time information (544), indicating the date and time of the voicemail. Finally, the main screen area (536) includes the words of the voicemail converted to text (546). The user can scroll down to see any text not initially displayed. Accordingly, a user in a meeting can view a voicemail on a device display screen without listening to the communication device.

C. Text-to-Audio Conversion Flow Example (Incoming Voicemail Converted by Service Provider)

Figure 6:
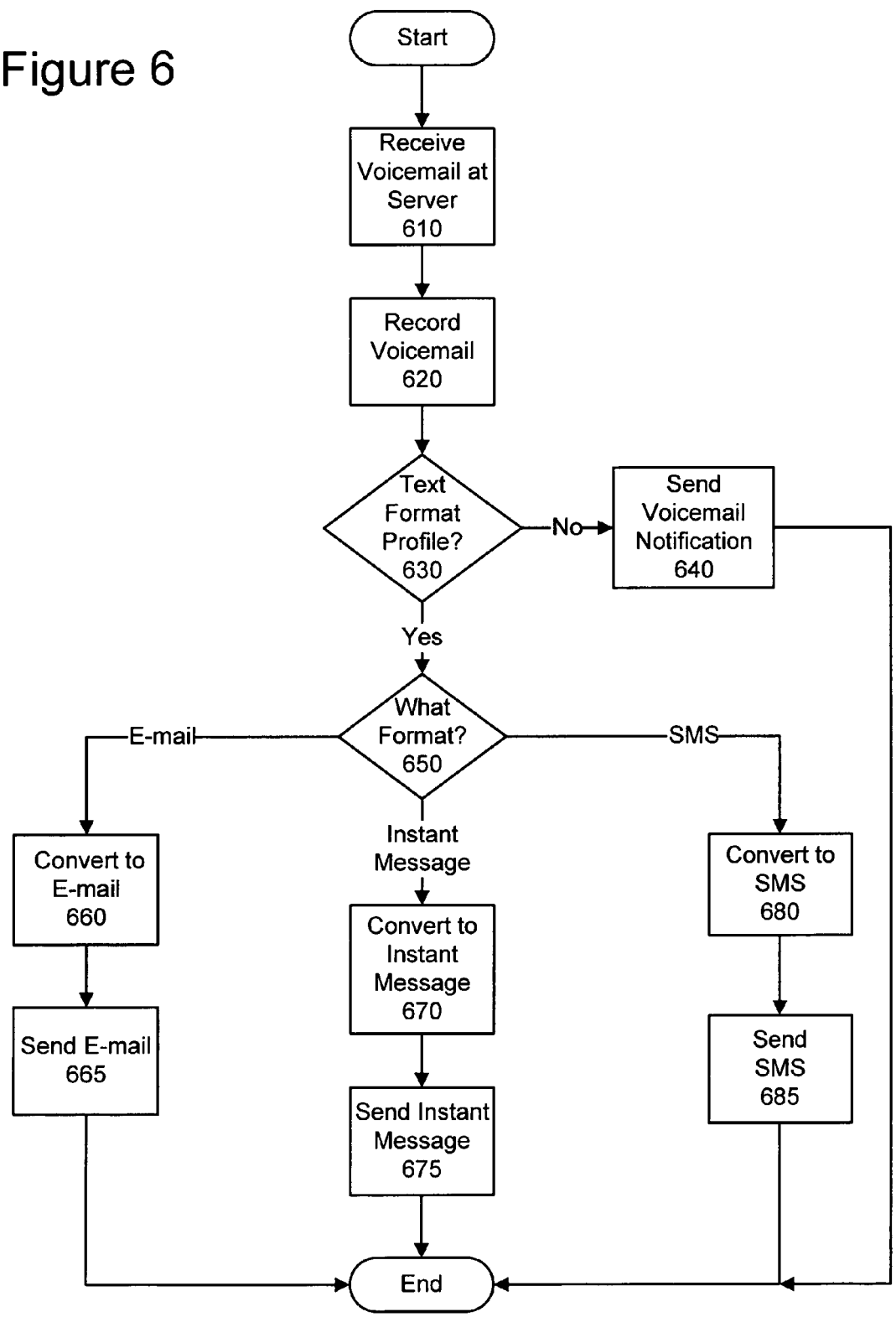
FIG. 6 is a flow diagram illustrating a process for receiving a voicemail at a server and sending the words of the voicemail to a client when a text only format profile is available.

FIG. 6 is a flow diagram illustrating a process for receiving a voicemail at a server, such as the server of a mobile telephone service provider, and converting the voicemail to a desired format before sending the voicemail to a client, such as a mobile telephone. A voicemail for a particular user is received at the server (610) in a typical manner and is recorded (620), such as by saving it in a standard digital audio format. It is determined whether there is a text format profile currently active for the user (630). Such a profile could have been sent to the server previously by one of the user's client devices, such as a mobile telephone. If there is no such active profile, then a voicemail notification is sent to a client, such as the user's mobile telephone (640). Later, the user can check voicemails and request the download of the audio voicemail. Alternatively, the voicemail can be sent along with the notification.

If there is a text format profile currently active for the user, then it is determined what type of textual format has been specified for the user's voicemails (650). If e-mail format is specified, then the voicemail is converted from audio to text and is formatted as an e-mail (660). The conversion of audio to text can be done using standard voice recognition software, such as the software sold under the name VoiceIn by Fonix Corporation of Sandy, Utah. The voice recognition software can be used in conjunction with an existing operating system, such as a Windows Mobile or Windows CE operating systems available from Microsoft Corporation. In formatting the message, pertinent fields can be filled with relevant information. For example, the subject line can indicate that the message is a converted voicemail, and can include available time and caller ID information. After the voicemail is converted to an e-mail, the e-mail is sent to the user's e-mail account in a typical manner (665). Rather than the e-mail being sent immediately, a notification can be sent initially, and the e-mail can be sent when the e-mail is requested by the client.

If instant message format is specified, then the voicemail is converted from audio to text and is formatted as an instant message (670). The resulting instant message is sent to the client (675). Likewise, if SMS format is specified, the voicemail is converted from audio to text and is formatted as a SMS message (680). The SMS message is then sent to the client (685).

Alternatively, voicemails converted to text can always be sent in a particular format, such as SMS. Also, the messages can be sent in a unique voicemail textual format that can include fields for caller ID information, date and time of the voicemail, and the text of the message (such as the format displayed as display screen (530) in FIG. 5). Additionally, if the client always displays textual messages in one format (whether they were sent as an e-mail, SMS message, etc.) then that format can be used. Moreover, the original audio voice message may be stored so that it can be sent to the client later if the user wants to listen to the original audio voice message.

D. Audio-to-Text Conversion Flow Example 2 (Incoming Voicemail Converted by Client Device)

Figure 7:
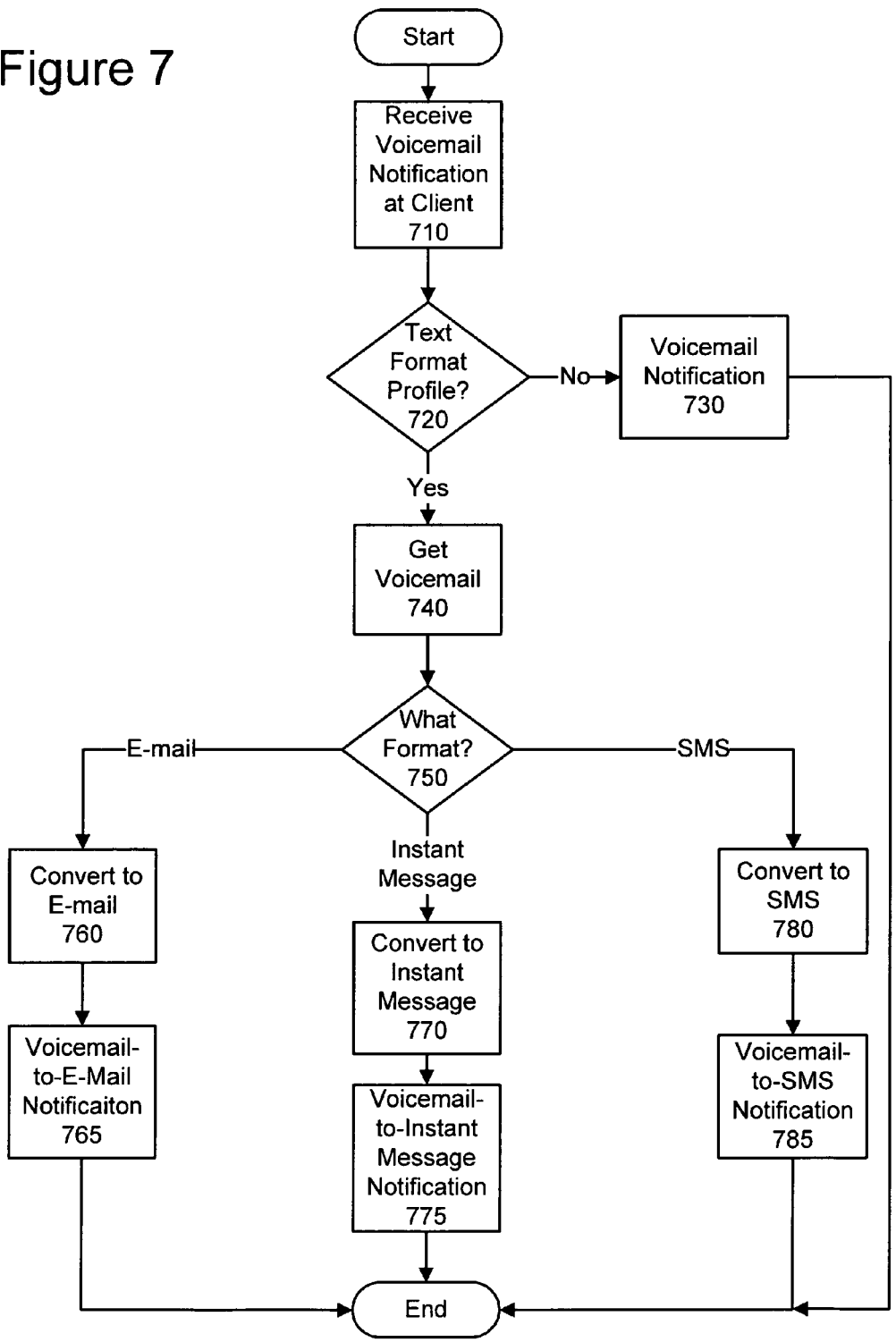
FIG. 7 is a flow diagram illustrating the receipt of a voicemail at a client and notification of a user when a text only format is available.

FIG. 7 is a flow diagram illustrating receipt of a voicemail at a client, such as a mobile telephone, and conversion of the voicemail to a desired textual format before notifying the user of the presence of the voicemail. A voicemail notification is received (710), such as a notification from a voicemail service provider. It is determined whether a text format profile that requires voicemails to be converted to text is active (720). If not, then a standard voicemail notification, such as a ring and/or a visual notification, is provided by the client device (730). If a text format profile requiring voicemails to be converted to text is active, then the client device retrieves the voicemail from a server (740). Retrieval of the voicemail by the client can be done automatically. Alternatively, the client could wait to retrieve the voicemail until the client has issued a notification and has accepted user input requesting the voicemail.

The client device determines the specified textual format (750). If the specified format is e-mail, then the client converts the words of the voicemail to text and formats the message as an e-mail (760). As with the server conversion example above, the audio-to-text conversion can be done using commercially available voice recognition software such as the software sold under the name VoiceIn by Fonix Corporation of Sandy, Utah. A voicemail-to-e-mail notification, such as a visual display notification, is issued (765). The notification can include a visual display of the message itself. The representation of the resulting e-mail can be included in a voicemail inbox, an e-mail inbox, a general messaging inbox, or in combinations of these or other inboxes. Additionally, the audio voicemail can be either saved or discarded, depending on the capabilities of the client and user preferences.

If the specified format is instant message, then the client converts the words of the voicemail to text and formats the message as an instant message (770). A voicemail-to-instant message notification is issued (775), indicating to the user that a voicemail has been received and converted to an instant message.

Likewise, if the specified format is SMS, then the client converts the words of the voicemail to text and formats the message as a SMS message (780). A voicemail-to-SMS message notification is issued (785), indicating to the user that a voicemail has been received and converted to a SMS message.

E. Audio-to-Text Conversion Flow Example 3 (Incoming E-mail Converted by Client Device)

Figure 8:
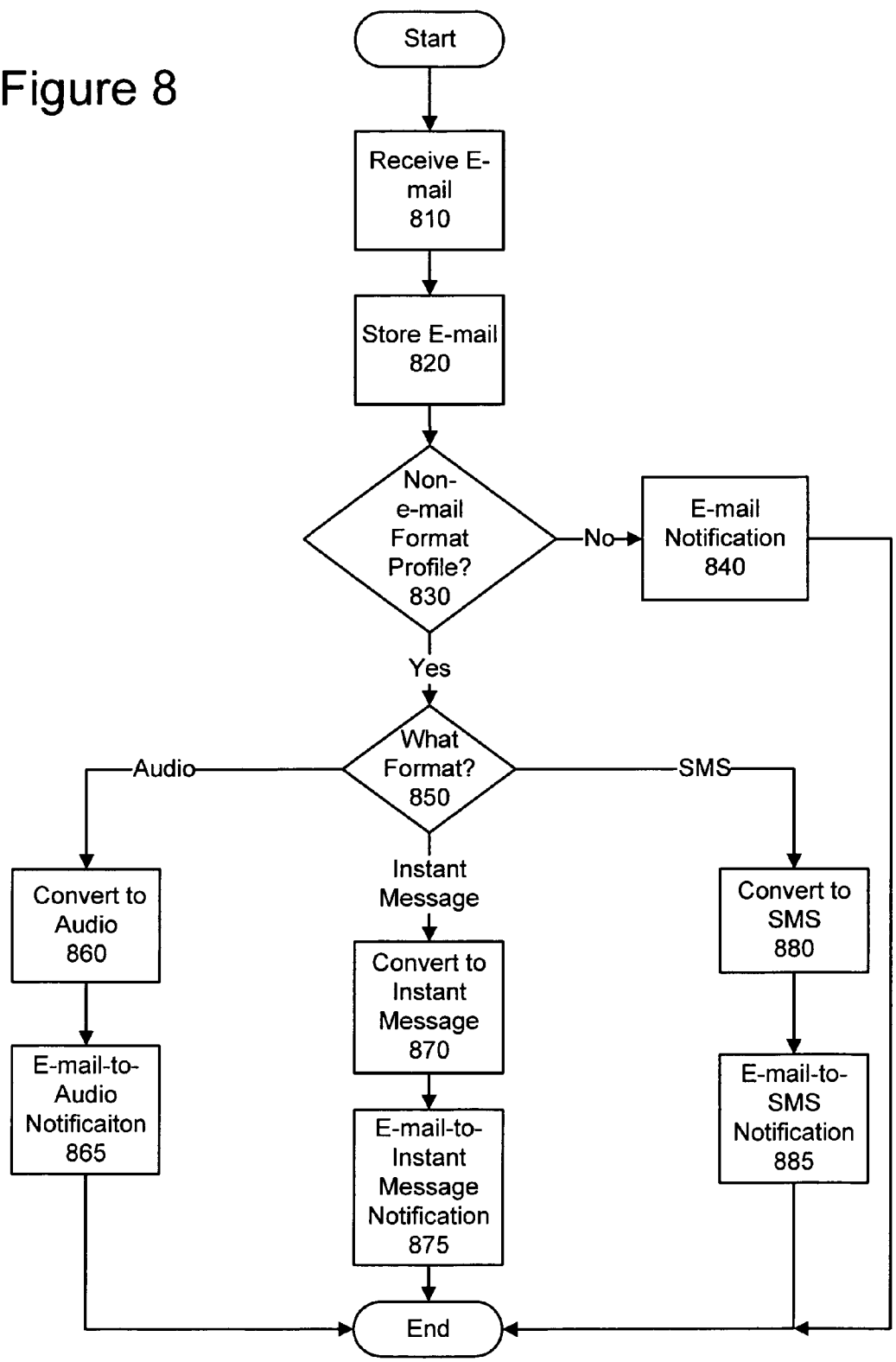
FIG. 8 is a flow diagram illustrating receipt of an e-mail and notification of a user when an audio only format and multiple text only formats are available.

FIG. 8 is a flow diagram illustrating receipt of an e-mail and conversion of the e-mail to a specified format. An e-mail is received in a standard manner (810). This may be done with or without a user specifically requesting the e-mail. The e-mail is stored (820), and it is determined whether a non-e-mail format profile is currently active (830). If no non-e-mail format profile is currently active, then a standard e-mail notification is issued (840).

If a non-e-mail format profile is currently active, then it is determined what format is specified by the profile (850). If the format is an audio or speech format, then the e-mail is converted to audio (860). This text-to-audio conversion can be done using commercially available text-to-speech software, such as the software sold under the trademark DECtalk by Fonix Corporation of Sandy, Utah. Such software can be used in conjunction with a commercially available operating system such as Windows Mobile or Windows CE operating systems available from Microsoft Corporation. The audio can be saved as a standard audio file, such as a .wav file. An e-mail-to-audio notification is issued (865). Such a notification can be an audio notification so that the user is not required to view the device. The notification could also include a visual notification if desired by the user. The user can also provide an audible command to play the message, and the message will be read to the user. Accordingly, a device user can monitor incoming e-mails without being required to view a display screen.

Similarly, a textual component of an audio communication, such as caller ID information for a telephone call, can be converted to audio and read to a user if the active profile so specifies. Thus, in an audio-only format, a device could read caller ID information to the user, allowing the user to make an informed decision as to whether to take a call without being required to view a display screen. Similarly, an audio component of a textual communication (such as a .wav file attached to an e-mail) could be converted to text.

Additionally, if an active profile specifies a textual message format other than e-mail, then the e-mails can be converted to the desired format. If the format is instant message, then the e-mail is converted to instant message format (870), and an e-mail-to-instant message notification is issued (875). Such a notification could be visual and/or audio. Similarly, if the profile specifies SMS format, then the e-mail is converted to SMS format (880) and an e-mail-to-SMS notification (885) is issued.

F. Audio-to-Text Conversion Flow Example 3 (Outgoing Textual Message Converted From Audio by Client Device)

Figure 9:
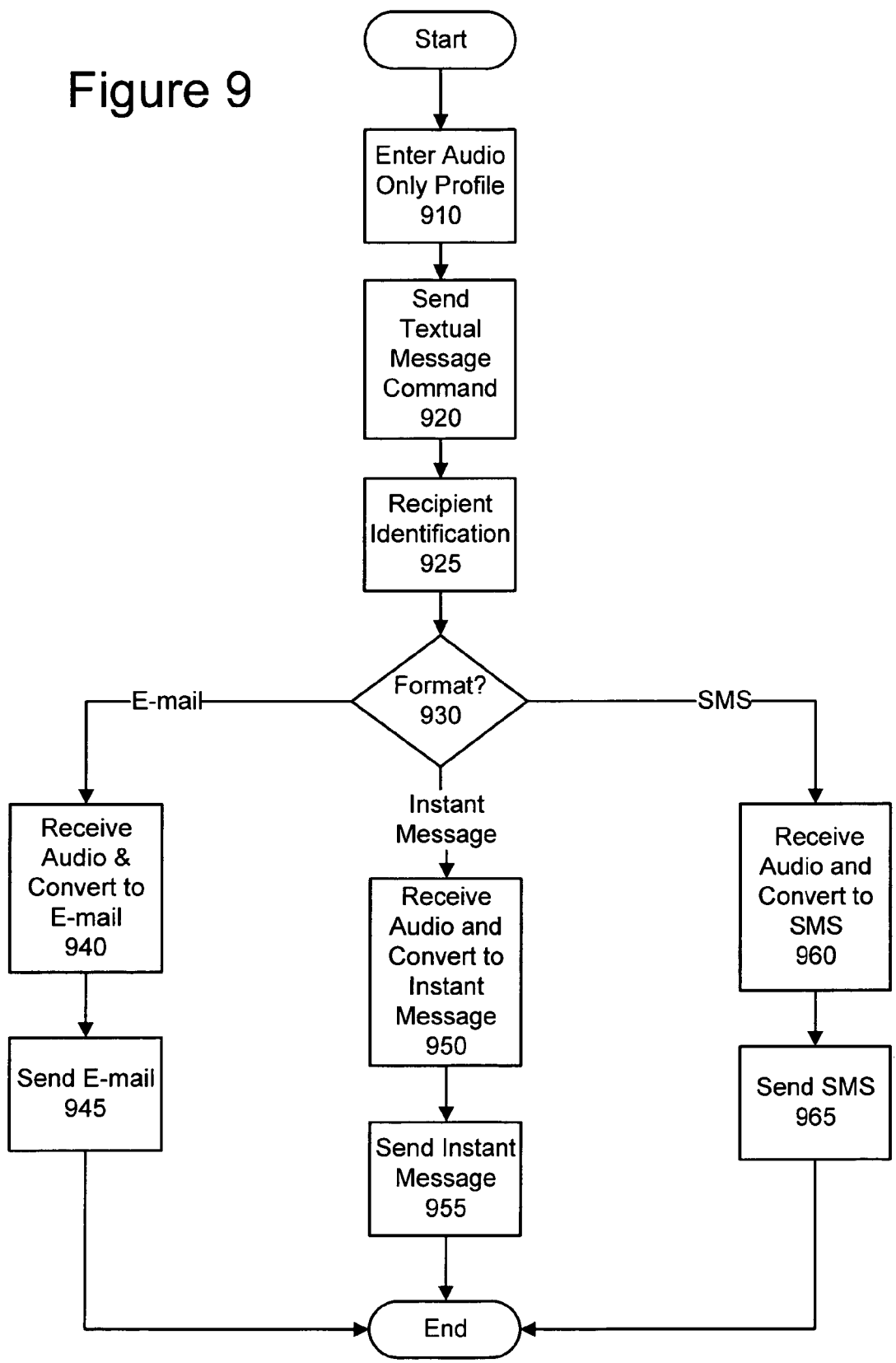
FIG. 9 is a flow diagram illustrating the creation and sending of a message that is entered as audio by the user, but is converted to a textual format and sent in the textual format.

FIG. 9 is a flow diagram depicting the creation and sending of a message that is audibly entered by the user, but is converted to a textual format and sent in the textual format. An audio only profile is entered (910). The profile specifies that original messages are to be entered as audio, but formatted and sent in a textual format, such as SMS, instant message, or e-mail. Voice recognition software, such as the software discussed above, can be used for processing voice commands and for converting messages from audio to text. A send textual message command is entered by the user (920), and a recipient is identified by the user (925). For example, the user could say, "E-mail Kim Akers." The communication device may then audibly verify that the command had been correctly recognized by asking, "Did you say, 'e-mail Kim Akers?'" To which a user will respond, "Yes."

The device determines the desired format (930). The specified format can be specified by the user as with the command, "E-mail Kim Akers." Alternatively, the format can be dictated by an active profile. For example, a profile could specify that all outgoing messages are to be formatted and sent as SMS messages. As another example, if the user is replying to a received message, the profile may dictate that outgoing replies be in the same format as the messages to which they are replying.

If the specified format is e-mail, then the device will accept the message from the user as audio, convert the message to text, and format it as an e-mail (940). For example, the device can say, "Speak the subject line of your message." The user will then speak the desired e-mail subject line. After the user pauses, the device can say, "Speak the body of your message." The user will then speak the desired message body. After a sufficient pause by the user, the device will verify that the message is complete, will convert the audio to text, and format the text as an e-mail. The device will then send the e-mail (945).

If the specified format is instant message, then the device will accept the message from the user as audio, convert the message to text, and format the message as an instant message (950). The device will then send the instant message (955). Similarly, if the specified format is SMS, the device will accept the message from the user as audio, convert the message to text, and format the message as a SMS message (960). The device will then send the SMS message (965).

G. Audio-to-Text Conversion Flow Example 3 (Outgoing Textual Message Converted From Audio by Client Device)

Figure 10:
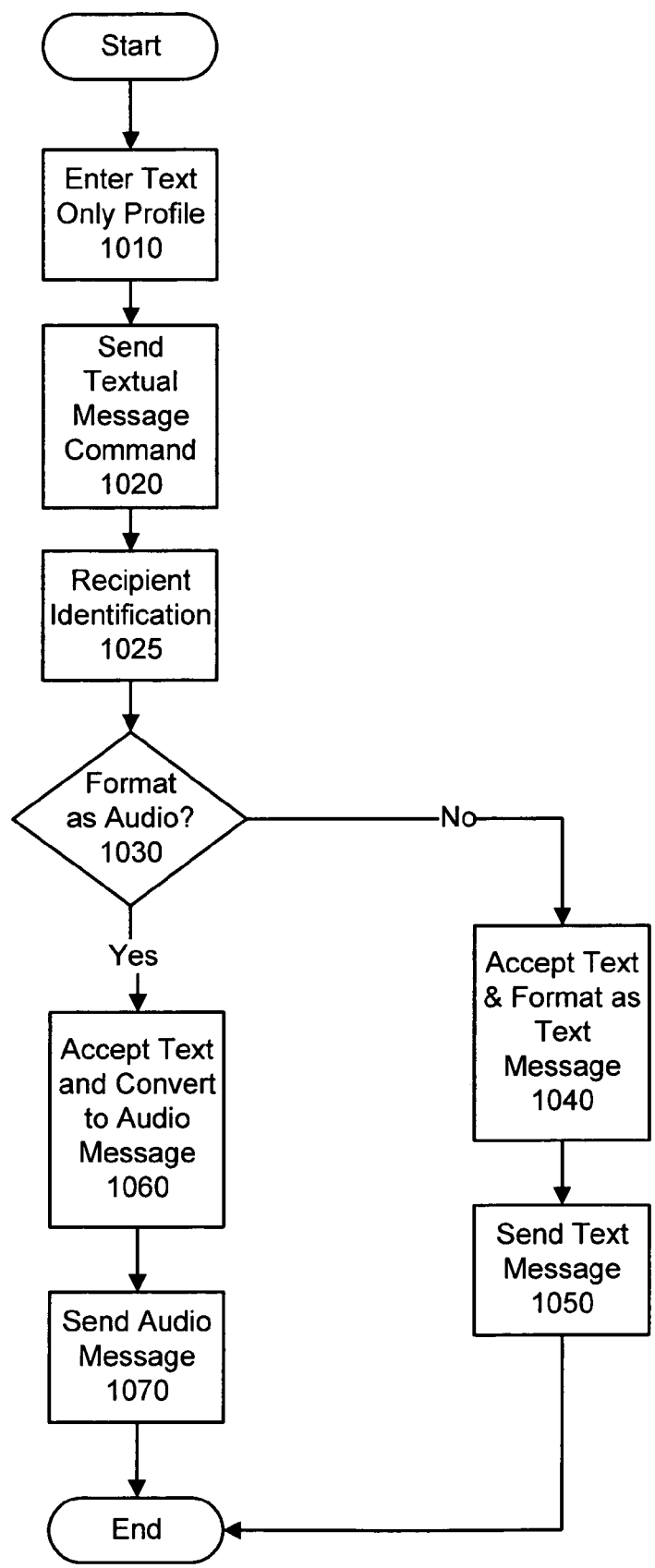
FIG. 10 is a flow diagram illustrating the creation and sending of a message that is entered as text by the user, but may be converted to an audio format and sent in the audio format.

FIG. 10 is a flow diagram depicting the creation and sending of a message that is entered as text by the user, but is converted to an audio format and sent in the audio format. A text only profile is entered (1010). The profile specifies that original messages are to be entered as text, but formatted and sent in an audio format as voice messages. Text-to-audio conversion software, such as the software discussed above, can be used for converting messages from text to audio. A send audio message command is entered by the user (1020), and a recipient is identified by the user (1025). The command and identification can both be entered as text, such as by selecting from various menu commands and various contacts on a list.

It is determined whether the outgoing message should be formatted as an audio message (1030). The specified format can be specified by the user at the time the message is created. Alternatively, a profile could specify that all outgoing messages are to be formatted and sent in a particular format. As another example, if the user is replying to a received message, the profile may dictate that outgoing replies be in the same format as the messages to which they are replying. As discussed above, the user can specify such profile settings. For example, the user can do so by using the selection boxes on the display screen (400) discussed above with reference to FIG. 4.

If the message is not to be formatted as an audio message, then the device accepts text entered by the user and formats the resulting message as a text message in a standard fashion (1040). The message is then sent as a text message (1050).

If the message is to be formatted as an audio message, then the device accepts text entered by the user, converts the text to audio, and formats the message as an audio voice message (1060). The audio message is then sent (1070).

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, we claim as my invention all such embodiments as may come within the scope and spirit of the following claims and equivalents thereto.

We claim:

1. A computer implemented method comprising:
   accepting a user command on a user computing device to select a desired profile for incoming messages to the user computing device from a group of available profiles, the group including a first profile and a second profile;
   activating the desired profile and storing the desired profile on the user computing device;
   if the desired profile is the first profile, and an incoming communication having a textual component is received by the user computing device while the first profile is active, then:
   converting the textual component to an audio format, wherein the converting is performed on the user computing device; and
   reciting the textual component; and
   if the desired profile is the second profile, and an incoming communication having an audio component is received by the user computing device while the second profile is active, then:
   converting the audio component to a textual format, wherein the converting is performed on the user computing device; and
   displaying the audio component as text;
   notifying one or more contacts that the desired profile is active, wherein notifying the one or more contacts comprises automatically sending a notification message to a plurality of contacts when the desired profile is activated.

2. The method of claim 1, further comprising:
accepting a user command to create an outgoing message in an outgoing format;
if the outgoing format is textual and the desired profile is the first profile, then accepting audio user input and converting the audio user input into a textual message; and
if the outgoing format is audio and the desired profile is the second profile, then accepting textual user input and converting the textual user input into an audio message.

3. The method of claim 1, wherein the textual format is a standard textual message format.

4. The method of claim 1, wherein:
reciting the textual component and displaying the audio component as text are performed at the user computing device.

5. The method of claim 1, wherein notifying the one or more contacts comprises sending an automatic reply message.

6. The method of claim 1, further comprising:
determining that a reminder should be issued; and
issuing the reminder, wherein issuing the reminder comprises:
if the first profile is active, reciting the reminder; and
if the second profile is active, displaying the reminder.

7. A communication device comprising:
a memory storing computer software;
a processor programmed to execute the software to:
accept set-up user input on the communication device related to conversion of messages between audio and text, the set-up user input being stored on the communication device;
receive an incoming communication on the communication device;
if the incoming communication has a textual component and the set-up user input dictates conversion of the textual component to audio, then convert the textual component to audio;
if the incoming communication has an audio component and the set-up user input dictates conversion of the audio component to text, then convert the audio component to text;
accept a user command on the communication device to create an outgoing message in an outgoing message format;
if the outgoing message format is textual and the set-up user input dictates that the outgoing message be entered as audio, then accept audio user input and convert the audio user input into a textual message; and
if the outgoing message format is audio and the set-up user input dictates that the outgoing message be entered as text, then accept textual user input and convert the textual user input into an audio message; and
notify one or more contacts that the desired profile is active by automatically sending a notification message to a plurality of contacts when the desired profile is activated.

8. The device of claim 7, wherein the textual message has a standard textual message format.

9. The device of claim 8, wherein the standard textual message format is selected from the group consisting of e-mail, short message service, and instant message.

10. The device of claim 7, wherein the set-up user input selects a desired profile.

11. The device of claim 10, wherein:
the desired profile is selected from a group of available profiles, the group of available profiles including a first profile and a second profile;
the first profile dictates conversion of the textual component to audio and dictates that the outgoing message be entered as audio; and
the second profile dictates conversion of the audio component to text and dictates that the outgoing message be entered as text.

12. The device of claim 7, wherein the communication device is a mobile device.

13. The device of claim 12, wherein the processor is programmed to further execute the software to:
if the incoming communication has the textual component and the set-up user input dictates conversion of the textual component to audio, then recite the textual component; and
if the incoming communication has the audio component and the set-up user input dictates conversion of the audio component to text, then display the audio component as text.

14. The device of claim 7, wherein the processor is programmed to further execute the software to forward the incoming communication to a client computer.

15. A computer-readable medium storing computer-executable instructions for causing a computer system to perform a method comprising:
accepting a user command on a user computing device to select a desired profile from a group of available profiles, the group of available profiles including an audio profile and a textual profile;
storing the selected profile on the user computing device;
activating the desired profile;
if the desired profile is the audio profile, then:
receiving an incoming textual message on the user computing device while the audio profile is active;
converting the textual message to an audio format; and
reciting the textual message on the user computing device; and
if the desired profile is a textual profile, then:
receiving an incoming audio message on the user computing device while the textual profile is active;
converting the audio message to a textual format; and
displaying the audio message in the textual format on the user computing device; and
notifying one or more contacts that the desired profile is active, wherein notifying the one or more contacts comprises automatically sending a notification message to a plurality of contacts in response to the desired profile being activated.

16. The computer-readable medium of claim 15, wherein the method further comprises:
accepting a user command to create an outgoing message;
if the user command dictates the creation of a textual message and the desired profile is the audio profile, then accepting audio user input and converting the audio user input into a textual message; and
if the user command dictates the creation of an audio message and the desired profile is the textual profile, then accepting textual user input and converting the textual user input into an audio message.

17. The computer-readable medium of claim 15, wherein the method further comprises notifying one or more contacts that the desired profile is active.

* * * * *